United States Patent

Tratz et al.

[11] Patent Number: 5,611,290
[45] Date of Patent: Mar. 18, 1997

[54] WASTE CONVEYOR

[75] Inventors: Herbert Tratz, Ottensoos; Karl May, Bad Vilbel; Hartmut Herm, Dreieich; Karlheinz Unverzagt, Seligenstadt, all of Germany

[73] Assignee: Siemens Aktiengesellschaft, Munich, Germany

[21] Appl. No.: 597,243

[22] Filed: Feb. 6, 1996

Related U.S. Application Data

[63] Continuation of PCT/DE94/00859, Jul. 25, 1994 published as WO95/04793, Feb. 16, 1995.

[30]   Foreign Application Priority Data

Aug. 6, 1993 [DE] Germany .......................... 43 26 483.2

[51] Int. Cl.⁶ .................. F23G 5/02; F23K 3/14
[52] U.S. Cl. .......... 110/222; 110/257; 110/258; 110/110; 241/260.1; 198/671
[58] Field of Search ...................... 110/222, 227, 110/228, 232, 257, 258, 286, 110; 198/670, 671, 497; 241/260.1

[56]          References Cited

U.S. PATENT DOCUMENTS 1,787,671  11/1928  Daniels, Sr. ............... 198/671
2,542,476  2/1951  Carlson .
3,337,026  8/1967  Silver et al. .
4,504,222  3/1985  Christian .................. 110/110

FOREIGN PATENT DOCUMENTS 0302310  2/1989  European Pat. Off. .
2404520  4/1979  France .
3830153  3/1990  Germany .

*Primary Examiner*—Henry A. Bennett
*Assistant Examiner*—Susanne C. Tinker
*Attorney, Agent, or Firm*—Herbert L. Lerner; Laurence A. Greenberg

[57]          ABSTRACT

A waste conveyor includes a conveyor channel. A feed shaft is connected to the conveyor channel. A worm is disposed in the longitudinal direction of the conveyor channel. The worm has a shaft with an axis. A first metal cutter is disposed at an edge of a portion of the worm and is curved relative to the axis of the shaft. A second metal cutter is disposed at a portion of the conveyor channel, is curved relative to the axis of the shaft and has a radius of curvature being greater than the radius of curvature of the first metal cutter. The two metal cutters are disposed side by side and approximately concentric to the shaft, at a predetermined rotary position of the worm.

8 Claims, 1 Drawing Sheet

WASTE CONVEYOR

CROSS-REFERENCE TO RELATED APPLICATION

This application is a Continuation of International Application PCT/DE94/00859, filed Jul. 25, 1994.

BACKGROUND OF THE INVENTION

Field of the Invention

The invention relates to a waste conveyor, in which a feed shaft is connected to a conveyor channel and a worm is disposed in the longitudinal direction of the conveyor channel.

The waste conveyor is used for thermal waste disposal, especially according to the low-temperature carbonization combustion process.

In the field of waste disposal, the so-called low-temperature carbonization combustion process has become known. The process and a system operating according to that process for thermal waste disposal are described, for instance, in Published European Patent Application 0 302 310 A1, corresponding to U.S. Pat. No. 4,878,440 as well as in German Published, Non-Prosecuted Patent Application DE 38 30 153 A1. As its essential components, the system for thermal waste disposal according to the low-temperature carbonization combustion process includes a pyrolysis reactor and a high-temperature combustion chamber. The pyrolysis reactor converts waste which is fed through a waste conveyor of the type referred to at the outset, into low-temperature carbonization gas and pyrolysis residue. The low-temperature carbonization gas and the pyrolysis residue are then delivered, after suitable preparation, to a burner of a high-temperature combustion chamber. That produces molten slag, which can be removed through an outlet and which is in vitrified form after it cools down. The flue gas which is produced is sent through a flue gas line to a chimney serving as an outlet. A waste heat steam generator acting as a cooling device, a dust filter system, and a flue gas cleaning system, in particular, are built into the flue gas line. A gas compressor, which is disposed directly at the outlet of the flue gas cleaning system and may be constructed as a suction blower, is also located in the flue gas line. The built-in gas compressor serves to transport gas through the system and in particular to maintain a negative pressure, however slight, in the pyrolysis drum. That negative pressure prevents low-temperature carbonization gas from escaping to the outside environment through ring seals of the pyrolysis drum.

It has been found that in a low-temperature carbonization combustion system the waste conveyor can be blocked or impeded, if excessively large particles of waste fall from the feed shaft into the worm. As a rule, the waste is comminuted beforehand. However, it is possible for the portion of the coil that is rotating just below the feed shaft to already be filled up to a certain level, so that a waste particle, such as a piece of wood falling in, cannot slide any farther inward and jam at the corner of the feed shaft. There is also the danger of the corner of the feed shaft and/or the edge of the worm becoming damaged because of the jamming action.

SUMMARY OF THE INVENTION

It is accordingly an object of the invention to provide a waste conveyor, which overcomes the hereinafore-mentioned disadvantages of the heretofore-known devices of this general type in such a way that malfunction-free and blockage-free operation is assured, even if a relatively large waste particle does not fall all the way into the worm.

With the foregoing and other objects in view there is provided, in accordance with the invention, a waste conveyor, comprising a conveyor channel having a longitudinal direction and a portion; a feed shaft connected to the conveyor channel; a worm being disposed in the longitudinal direction of the conveyor channel, the worm having a shaft with an axis and having a portion with an edge; a first metal cutter being disposed at the edge of the portion of the worm, being curved relative to the axis of the shaft and having a given radius of curvature; and a second metal cutter being disposed at the portion of the conveyor channel, being curved relative to the axis of the shaft and having a radius of curvature being greater than the given radius of curvature; the two metal cutters being disposed side by side and approximately concentric to the shaft, at a predetermined rotary position of the worm.

The first metal cutter serves to cut off or shear off a waste particle that has fallen in at the corner of the feed shaft, for instance. Therefore, the first metal cutter can also be called a cutting edge or cutting device. Since a portion of the conveyor channel is provided with a second metal cutter, the two metal cutters act like a pair of scissors upon rotation of the shaft of the worm. In other words, they shear apart or break off the waste particle that has fallen in. In this way, blockage-free operation is assured.

In accordance with another feature of the invention, the metal cutters are flat iron bars or profiled iron bars.

In accordance with a further feature of the invention, the metal cutters are formed of a wear-resistant steel, in order to attain a high cutting action and a long service life.

In accordance with an added feature of the invention, the feed shaft and the conveyor channel define a rear corner region therebetween, as seen in a conveying direction, and the second metal cutter is disposed in the rear corner region.

In accordance with an additional feature of the invention, the conveyor channel is n-sided, where n is a number greater than or equal to 4.

In accordance with yet another feature of the invention, at least one of the metal cutters is curved over approximately 180° relative to the axis of the worm.

In accordance with a concomitant feature of the invention, there is provided a pyrolysis reactor to which the conveyor channel is connected.

Other features which are considered as characteristic for the invention are set forth in the appended claims.

Although the invention is illustrated and described herein as embodied in a waste conveyor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
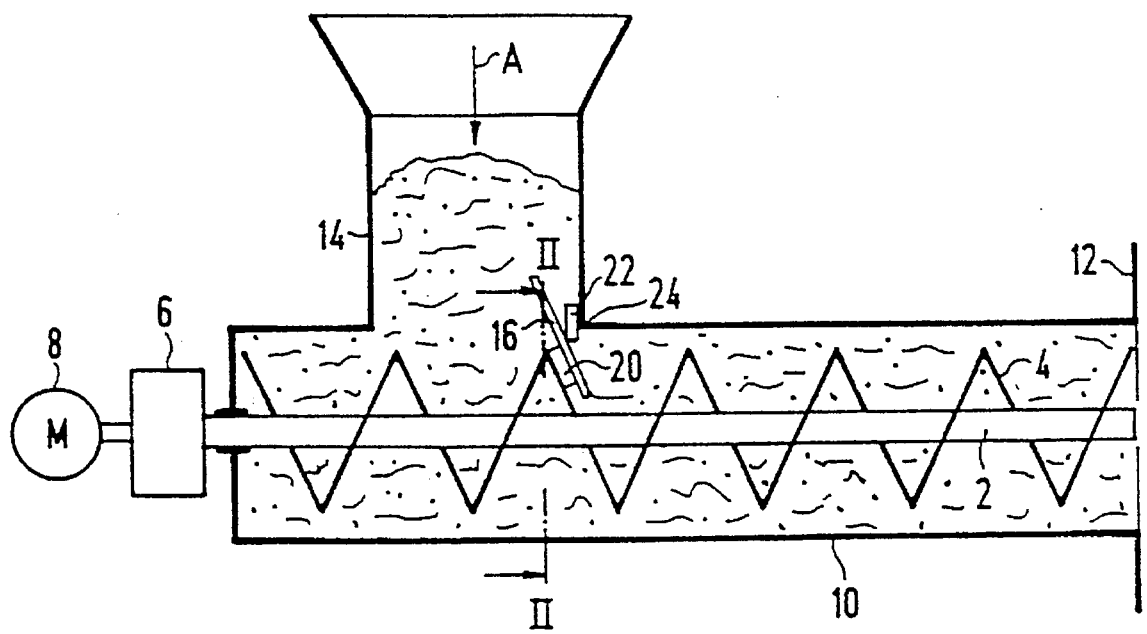
FIG. 1 is a diagrammatic, longitudinal-sectional view of a waste conveyor.

Referring now to the figures of the drawing in detail and first, particularly, to FIG. 1 thereof, there is seen a shaft 2 of a worm or worm coil 4 of a waste conveyor, which is driven by a motor 8 through a gear 6. The worm 4 is disposed longitudinally of a stationary trough, worm trough or conveyor channel 10. In the present example, this conveyor channel 10 is especially connected to a pyrolysis reactor 12 of a low-temperature carbonization combustion system. A feed shaft 14 for waste A leads laterally into the conveyor channel 10. The conveyor channel 10 is preferably constructed to be n-sided, where n is a number equal to or greater than 4. In the present case, the conveyor channel 10 is constructed to be octagonal, which can be seen particularly in FIG. 2.

During operation of the motor 8, the waste A is conveyed by the worm 4 from left to right to the pyrolysis reactor 12. It is assumed in FIG. 1 that a relatively large waste particle 16 has become jammed at a right corner of the feed shaft 14, between the feed shaft and the worm 4. In order to shear or cut off this waste particle 16 by the rotation of the shaft 2, a first and a second metal cutter 20 and 22 are provided. In any case these two metal cutters 20, 22 are disposed side by side in a certain rotary position of the shaft 2.

Figure 2:
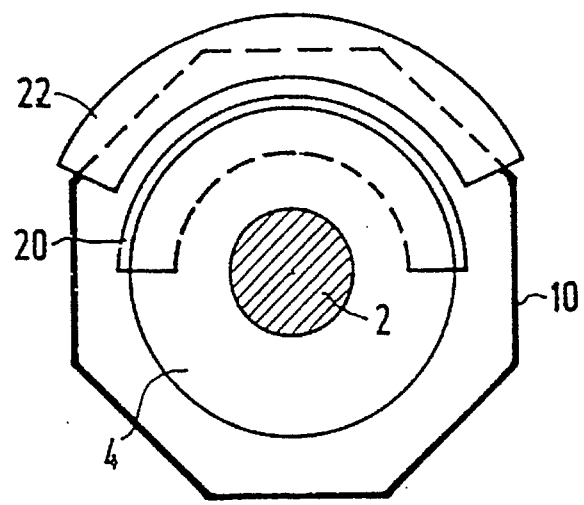
FIG. 2 is a cross-sectional view of a worm with a cutting device, which is taken along a line II—II of FIG. 1, in the direction of the arrows.

It can be seen from FIGS. 1 and 2 that the first metal cutter 20 is located at an edge of a portion of the worm 4. The first metal cutter 20 is formed of a flat metal strip, or flat iron or bar for short, which is curved by about 180° relative to the shaft 2. The first metal cutter 20 protrudes somewhat past the edge of the worm 4. The first metal cutter 20 is located in the vicinity of a rear corner 24 between the feed shaft 14 and the conveyor channel 10, wherein the term rear is defined in terms of the conveying direction.

The second metal cutter 22 is disposed at a portion of the conveyor channel 10 and it is especially located in this case at the right inner corner 24 of the feed shaft 14. This second metal cutter 22 is also constructed as a flat iron or bar. In order to assure durable operation, both metal cutters 20, 22 are made from a high-strength steel. The flat iron bar 22 is also curved and it has a somewhat larger radius of curvature than the first-mentioned flat iron bar 20. The second metal cutter 22 is also curved by about 180° relative to the axis of the shaft 2 of the worm 4. It can be seen from FIG. 2 that the two metal cutters 20, 22 are curved in such a way with respect to the axis of the shaft 2 of the worm 4 that the first metal cutter 20, during operation of the worm 4, moves approximately parallel and closely past the second metal cutter 22. The action of a scissors is thus achieved. The waste particles 16, especially pieces of wood and plastic, are cut cleanly through by the two metal cutters 20, 22 at the corner 24 of the feed shaft 14. Thus a blockage of the conveyor device cannot occur.

We claim:

1. A waste conveyor, comprising:

a conveyor channel having a longitudinal direction and a portion;

a feed shaft connected to said conveyor channel;

a worm being disposed in the longitudinal direction of said conveyor channel, said worm having a shaft with an axis and having a portion with an edge;

a first metal cutter being disposed at said edge of said portion of said worm, being curved relative to the axis of said shaft and having a given radius of curvature; and a second metal cutter being disposed at said portion of said conveyor channel, being curved relative to the axis of said shaft and having a radius of curvature being greater than said given radius of curvature;

said two metal cutters being disposed side by side and approximately concentric to said shaft, at a predetermined rotary position of said worm.

2. The waste conveyor according to claim 1, wherein said metal cutters are flat iron bars.

3. The waste conveyor according to claim 1, wherein said metal cutters are profiled iron bars.

4. The waste conveyor according to claim 1, wherein said metal cutters are formed of wear-resistant steel.

5. The waste conveyor according to claim 1, wherein said feed shaft and said conveyor channel define a rear corner region therebetween, as seen in a conveying direction, and said second metal cutter is disposed in said rear corner region.

6. The waste conveyor according to claim 1, wherein said conveyor channel is n-sided, where n is a number at least equal to 4.

7. The waste conveyor according to claim 1, wherein at least one of said metal cutters is curved over approximately 180° relative to the axis of said worm.

8. A waste conveyor assembly, comprising:

a pyrolysis reactor;

a conveyor channel being connected to said pyrolysis reactor and having a longitudinal direction and a portion;

a feed shaft connected to said conveyor channel;

a worm being disposed in the longitudinal direction of said conveyor channel, said worm having a shaft with an axis and having a portion with an edge;

a first metal cutter being disposed at said edge of said portion of said worm, being curved relative to the axis of said shaft and having a given radius of curvature; and a second metal cutter being disposed at said portion of said conveyor channel, being curved relative to the axis of said shaft and having a radius of curvature being greater than said given radius of curvature;

said two metal cutters being disposed side by side and approximately concentric to said shaft, at a predetermined rotary position of said worm.

* * * * *